UNITED STATES PATENT OFFICE.

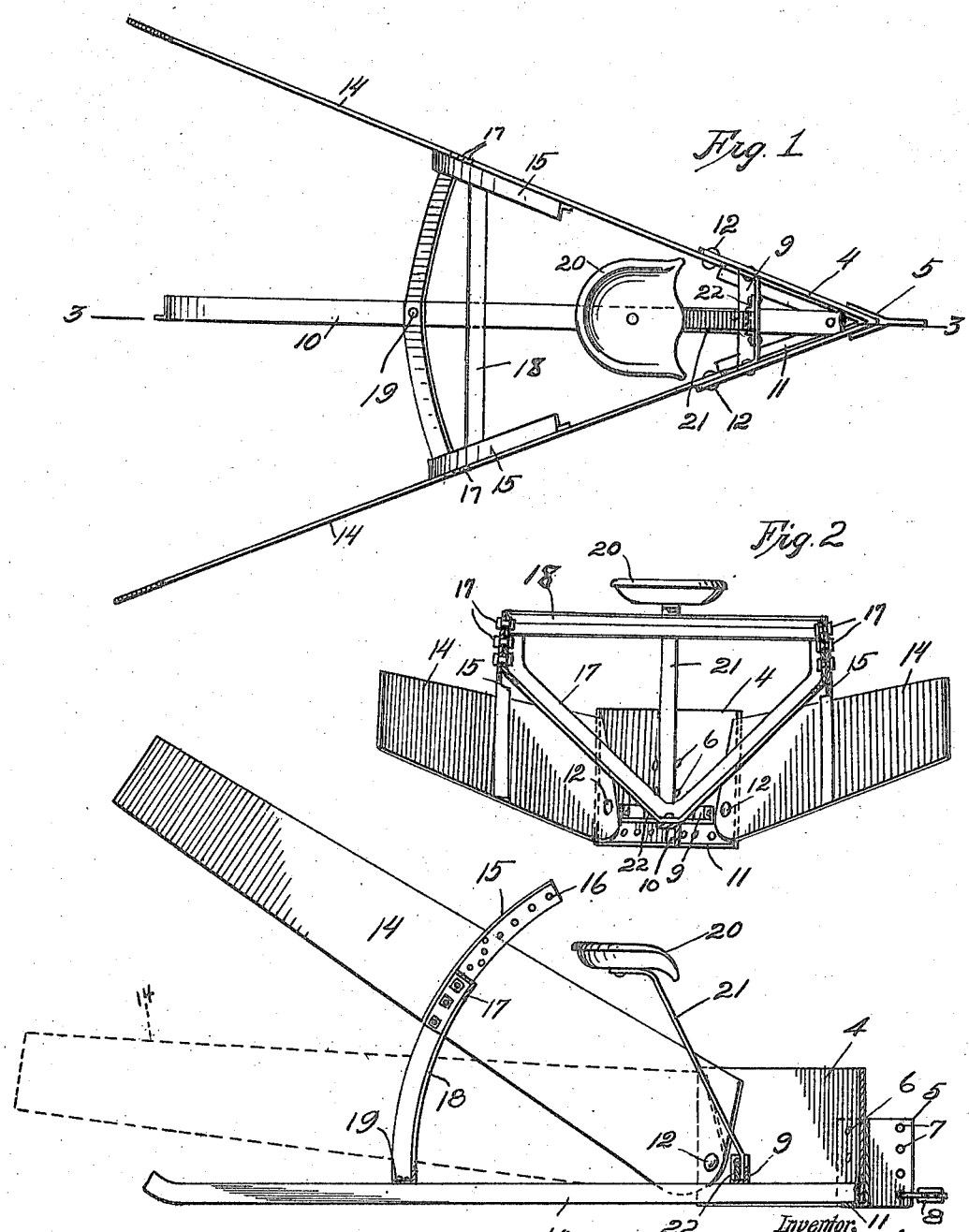

JOHN C. STARLING, OF LETHBRIDGE, ALBERTA, CANADA.

DITCHING DEVICE.

1,416,991.  Specification of Letters Patent.  Patented May 23, 1922.

Application filed March 24, 1920. Serial No. 368,434.

*To all whom it may concern:*

Be it known that I, JOHN C. STARLING, a citizen of the United States of America, and resident of Lethbridge, Province of Alberta, Dominion of Canada, have invented a certain new and useful Improvement in Ditching Devices, of which the following is a complete specification.

The present invention relates to apparatus for use in ditching operations, and aims to provide an improved ditching device especially adapted for operation in the construction of ditches in irrigated districts. For this purpose I provide an improved construction adapted for convenient operation by a single individual, due to the peculiar form and construction of the device, the same being such that it will always tend to right itself when drawn into the furrow that has been prepared for the ditcher's operation.

In carrying out the invention, I provide a ditcher construction which comprises a plow portion having earth deflecting members provided with means for independent adjustment relatively to the plow portion so that the earth is directed to the desired height at either side of the ditch being formed. Accordingly, the device is designed for operation in the construction of either deep or shallow ditches, the earth-deflecting members being adjusted conveniently for obtaining the desired result as regards the deposit of the material being deflected.

It is also sought to devise an extremely simple and efficient construction of the type described, having very few parts, and of a strong and durable nature that will not readily get out of order.

With these general objects in view, the invention will now be described by reference to the accompanying drawing illustrating one form of embodiment of the improvement, after which the novel features therein will be specifically set forth and claimed.

In the drawing:—

Figure 1 is a plan view showing a ditcher device constructed in accordance with the present invention;

Figure 2 is a rear elevation of the same partly in section; and

Figure 3 is a longitudinal sectional view, taken on the line 3—3 of Figure 1.

Referring now to the drawing in detail, this illustrates the improved construction as comprising a plow member 4 of acute angular form, to the angular edge of which is attached a combined hitch plate and plow point 5, which embraces both sides of the plow 4, to which it is rigidly secured by suitable fastenings 6. The front edge of the member 5 is provided with a vertical series of hitch openings 7, to which a suitable form of draft connection such as the chain 8 may be adjustably connected.

Extending transversely of the plow member 4 and secured rigidly to the inner faces thereof is a cross angle piece 9, beneath which extends a longitudinal runner member 10, the front end of which is supported upon and attached to an angle frame work 11 which extends around the lower margin of the plow 4.

At each side of the plow 4 is connected by means of a pivot pin or rivet 12 a wing or earth-deflecting member 14, the two wings 14 extending in rearwardly diverging relation forming in effect extensions of the two sides of the plow 4. The lower front corner of each of the wings 4 is rounded off, as shown in Figures 2 and 3, in order to clear the ends of the transverse member 9. Intermediate its ends, each of the wings 14 is provided with a curved angle piece 15 rigidly secured to the inner face of the wing, and of a length sufficient to project some distance above the top edge of the wing. Each of the angle pieces 15 is formed with a plurality of bolt openings 16 for the purpose of forming an adjustable connection by means of bolts 17 with a side of a substantially triangular frame 18, two sides of which converge downwardly to a point well towards the rear of a runner 10 where said frame 18 is attached by suitable fastenings 19 to said runner. The top of the frame 18 extends horizontally across the ditcher between the angle pieces 15 for the purpose of firmly bracing the structure. That portion of the frame 18 which carries the bolts is curved similarly to the angle pieces 15, so that when the wings 14 are moved for adjustment about their pivot points 12, the bolt openings in the angle pieces 15 and the frame 18 will be brought into register for the different positions of the wings 14.

A seat member 20, having a supporting shank 21 is located in front of the frame 18, the lower end of the shank 21 being fitted in a socket formed by a bracket member 22 which is secured by bolts 23 to the transverse member 9 on opposite sides of said shank.

It will thus be apparent that I have provided a simple and efficient device for fulfilling the desired objects of the invention. The device is constructed for easy and convenient operation by one man, the wing and runner construction being such that when the ditcher is drawn into the furrow which is prepared for its operation, the ditcher will automatically right itself, and thus save the operator the difficulty usually experienced in keeping the ditcher in its proper position. As the ditcher proceeds forward, the earth is deflected by the wings 14 to the opposite sides of the furrow and deposited at the desired height, according to the adjustment of said wings. In case it is desired to make the bank of the ditch comparatively high, or one of said banks high and the other low, the wings can be adjusted to meet these conditions. In the starting of a comparatively deep ditch, the wings will be adjusted to a level approximating somewhat the level of the runner 10, and as the depth of the ditch increases the wings are raised to higher levels so as to deposit the earth higher up on the bank. For more shallow ditching purposes, the wings are elevated to such a height as not to deposit the earth out too far. It is apparent that the construction of the ditcher is of an extremely simple nature having comparatively few parts making it easy to manipulate. While I have illustrated and described what is now deemed to constitute the preferred form of construction, I desire to reserve the right to make such changes as may fairly fall within the scope of the following claims.

What I claim is:

1. A ditching device comprising a plow portion, an earth-deflecting wing pivotally connected to said plow portion and extending in rearwardly diverging relation therefrom, a standard formed with a series of perforations and rigidly secured to said ring and extending above the same, a longitudinal runner extending rearward from said plow portion, a frame carried by said runner and provided with a perforation adapted to register with any one of said series of perforations in said standard, and a bolt adapted to secure the parts in fixed relation.

2. A ditching device comprising a plow portion, earth-deflecting wings pivotally connected to said plow portion and extending in rearwardly diverging relation therefrom, curved standards formed with a series of perforations and rigidly secured to said wings and extending above the same, a longitudinal runner extending rearwardly from said plow portion, a substantially triangular frame carried by said runner and provided with a series of perforations adapted to register with said series of wing perforations, and bolts adapted for securing the members in adjusted relation.

3. A ditching device comprising a plow portion, an earth-deflecting wing pivotally connected to said plow portion and extending in rearwardly diverging relation therefrom and provided with a series of perforations, a longitudinal runner extending rearwardly from said plow portion, a frame carried by said runner and provided with a series of perforations, for registration with said first-named perforations, and a bolt adapted to secure said frame and wing in adjusted relation.

In witness whereof I hereto affix my signature.

JOHN C. STARLING.